(12) United States Patent
Burnside et al.

(10) Patent No.: US 7,525,487 B2
(45) Date of Patent: Apr. 28, 2009

(54) RFID SHELF ANTENNAS

(75) Inventors: Walter D. Burnside, Dublin, OH (US); Robert J. Burkholder, Columbus, OH (US); Chan-Ping Edwin.Lim, Hilliard, OH (US)

(73) Assignee: YEON Technologies Co., Ltd., Taipei (TW)

( * ) Notice: Subject to any disclaimer, the term of this patent is extended or adjusted under 35 U.S.C. 154(b) by 8 days.

(21) Appl. No.: 11/750,307

(22) Filed: May 17, 2007

(65) Prior Publication Data
US 2008/0284654 A1 Nov. 20, 2008

(51) Int. Cl.
*H01Q 1/38* (2006.01)
(52) U.S. Cl. .............................. 343/700 MS
(58) Field of Classification Search .......... 343/700 MS, 343/702; 340/572.7
See application file for complete search history.

(56) References Cited

U.S. PATENT DOCUMENTS

| | | | | |
|---|---|---|---|---|
| 6,154,180 | A * | 11/2000 | Padrick | 343/722 |
| 7,319,398 | B2 * | 1/2008 | Marino | 340/572.7 |
| 2003/0174099 | A1 * | 9/2003 | Bauer et al. | 343/893 |
| 2004/0224135 | A1 * | 11/2004 | Krebs | 428/195.1 |
| 2006/0238307 | A1 * | 10/2006 | Bauer et al. | 340/10.1 |
| 2007/0188328 | A1 * | 8/2007 | Mochizuki et al. | 340/572.7 |

OTHER PUBLICATIONS

Cole, Peter H., "A Study of Factors Affecting the Design of EPC Antennas & Readers for Supermarket Shelves", University of Adelaide, Engineering, Adelaide, Australia, White Paper published Jun. 1, 2002.

* cited by examiner

*Primary Examiner*—Huedung Mancuso
(74) *Attorney, Agent, or Firm*—Holland & Knight LLP; Brian J Colandreo, Esq.

(57) ABSTRACT

This invention provides a shelf antenna system for radio frequency identification (RFID) applications, the shelf antenna system comprises a plurality of substantially horizontal shelves, and a distributed antenna having a single feed terminal and a plurality of radiating elements, the distributed antenna being mounted next to the plurality of substantially horizontal shelves, wherein the entire shelf space of the plurality of substantially horizontal shelves are covered by radiations from the distributed antenna.

25 Claims, 10 Drawing Sheets

RFID SHELF ANTENNAS

BACKGROUND

The present invention relates generally to radio frequency identification (RFID) antennas, and more specifically related to RFID antennas installed on shelves.

A RFID system uses radio frequency transmission to identify, categorize, locate and track objects. The RFID system comprises two primary components: a transponder or the RFID tag and a reader. The tag is a device that generates electrical signals or pulses interpreted by the reader. The reader is a transmitter/receiver combination (transceiver) that activates and reads the identification signals from the transponder. In order to effectively transmit and receive radio frequency signals, the reader often includes suitable antennas. The RFID tags are attached to objects that need to be tracked, and can be programmed to broadcast a specific stream of data denoting the object's identity, such as serial and model numbers, price, inventory code and date. A reader will detect the "tagged" object and further connects to a large network that will send information on the objects to interested parties such as retailers and product manufacturers. The RFID tags are considered to be intelligent bar codes that can communicate with a networked system to track every object associated with a designated tag. Therefore, the RFID tags are expected to be widely used in wholesale, distribution and retail businesses.

It is of interest to communicate with RFID tags attached to merchandise (or containers) stored on shelves in a warehouse or retail establishment. With existing technology, this may be achieved in one of two ways: (1) a mobile RFID scanner that moves along the shelves, possibly hand-held, or (2) by mounting a large number of fixed scanners to cover all the shelves. The former approach is very time consuming and labor-intensive, while the latter approach is very complex and expensive. The latter approach is particularly challenging because a static system will experience regions of signal fading (i.e., multipath interference) which must be overcome by providing sufficient spatial and polarization diversities. Furthermore, in the case of having multiple fixed scanners or reader antennas, it is difficult to conceal these devices in an aesthetically pleasing manner.

In view of the above applications, there is clearly a need to develop a RFID shelf antenna that can cover a large section of the shelf system without increasing the level of complexity and cost for the RFID system.

SUMMARY

This invention provides a shelf antenna system for radio frequency identification (RFID) applications, the shelf antenna system comprises a plurality of horizontal shelves, and a distributed antenna having a feed terminal at one end or both ends and a plurality of radiating elements, the distributed antenna being mounted next to the plurality of horizontal shelves, wherein the entire shelf space of the plurality of horizontal shelves are covered by radiations from the first distributed antenna.

The distributed antenna may comprise a parallel-plate transmission line with radiating elements formed thereon. The radiating elements may be recesses or slots cut into a top plate of the parallel-plate transmission line, or protruding conductive strips, loops or patches, electrically connected or capacitively coupled to the top plate and forming an angle relative to the direction of the parallel-plate waveguide. Additional distributed antennas closely placed with the original one may enhance the coverage of the shelf antenna system by providing spatial and polarization diversities. An extra tall shelf may employ multiple sections of the distributed antennas spliced together.

The construction and method of operation of the invention, however, together with additional objects and advantages thereof will be best understood from the following description of specific embodiments when read in connection with the accompanying drawings.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein. It should be noted that the features illustrated in the drawings are not necessarily drawn to scale.

DESCRIPTION

The present invention provides a RFID shelf antenna system that can cover a large section of a multi-layered shelf system with a single distributed antenna.

Figure 1A:
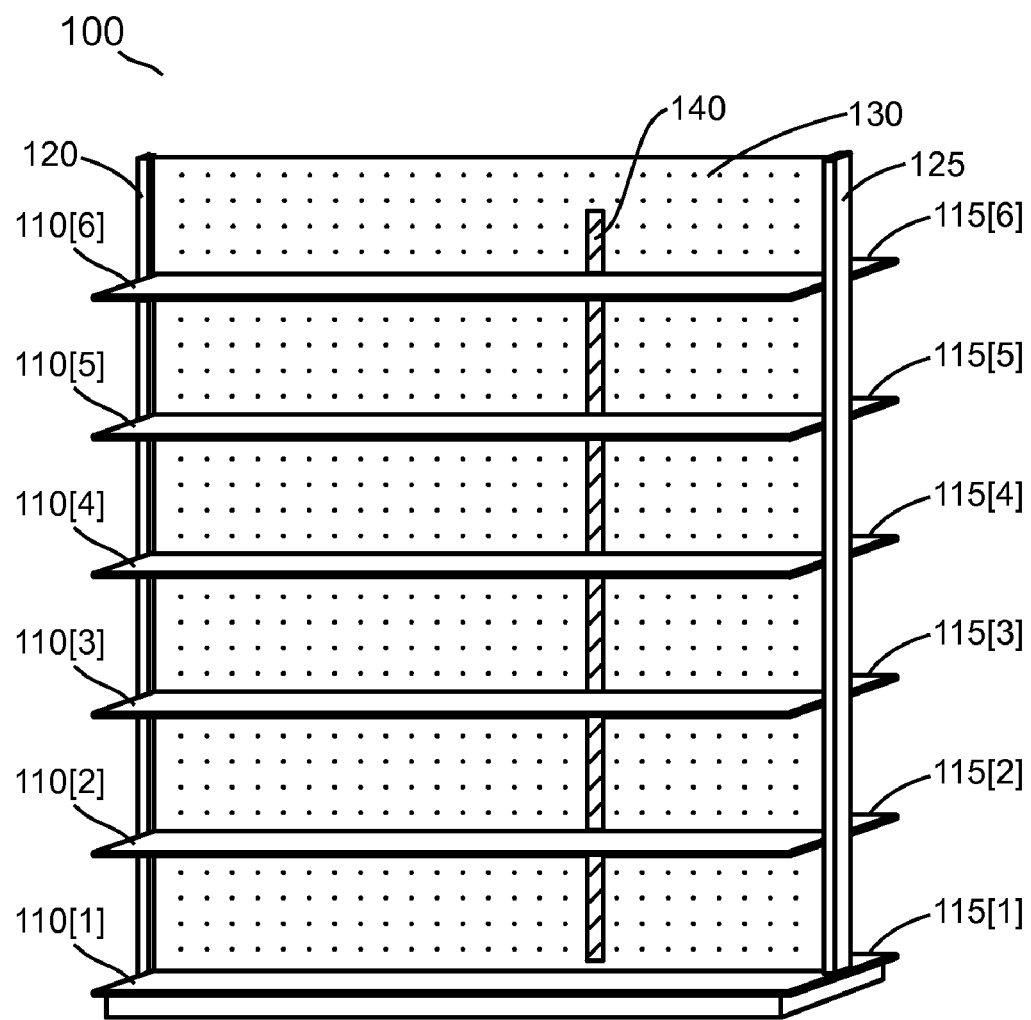
FIG. 1A is a perspective view of a shelf typically used in retail stores with a vertically installed distributed antenna according to a first embodiment of the present invention.

FIG. 1A is a perspective view of a 6' tall store shelf 100 typically found in retail stores with a vertically installed distributed antenna 140 according to an embodiment of the present invention. The store shelf 100 has six layers of metal shelves 110[1:6] and 115[1:6] mounted on a front and back side of vertical frames 120 and 125, so that merchandize can be placed on both sides of the store shelf 100. A peg board 130 is mounted in between the frames 120 and 125 to separate the front and back shelves, 110[1:6] and 115[1:6], respectively. The peg board 130 is typically made of materials transparent to radio frequency signals. A distributed antenna 140 is vertically attached to the peg board 130. A RFID reader (not shown) is then connected to the distributed antenna 140.

Referring back to FIG. 1A, in order to cover all the shelves from top to bottom, the length of the shelf antenna 140 in terms of radiating section should be at least equal to the height of the store shelf 100. In addition, the electromagnetic boundary conditions force the electric field on the metal shelves 110[1:6] and 115[1:6] to be normal to the metal surface; i.e., vertical polarization. Even though the shelf antenna 140 is mounted facing the front shelves, it is designed to radiate in all directions in the horizontal plane. Therefore, any tagged items on any of the shelves 110[1:6] or 115[1:6] can be interrogated through the distributed antenna 140. One skilled in the art would also realize that the embodiment of the antenna 140 shown in FIG. 1A could be used for shelves 110[1:6] only, in the event that the divider 130 is not pegboard or not transparent to radio frequency signals, or if shelves 115[1:6] are not present; the latter might occur if the shelving unit is placed against a wall.

Figure 1B:
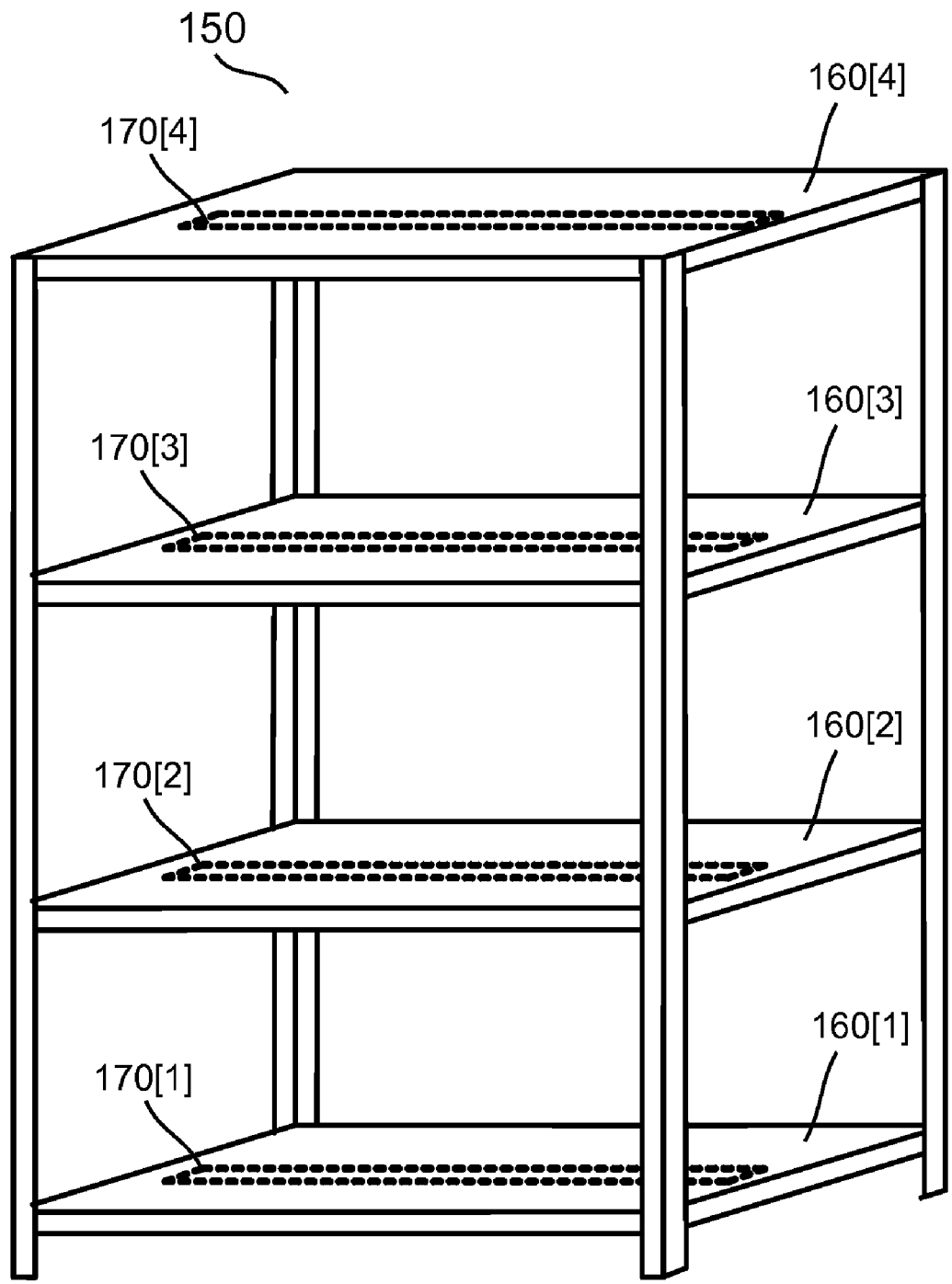
FIG. 1B is a perspective view of a shelf typically used in warehouses or retail stores with horizontally installed distributed antennas according to a second embodiment of the present invention.

FIG. 1B is a perspective view of a shelf 150 typically used in warehouses or large hardware retail stores with horizontally installed distributed antennas according to a second embodiment of the present invention. The shelf 150 is typically deeper and much taller than those in the shelf 100 of FIG. 1A. Furthermore, they may not have a vertical pegboard for mounting vertical distributed antennas. Therefore, the present invention proposes mounting one or more distributed antennas 170[1:4] on the underside of each shelf board 160 [1:4]. Each distributed antenna 170[1:4] covers a shelf space immediately thereunder. If the shelf boards 160[1:4] are made of wood or some other RF transparent material, each distributed antenna 170[1:4] also provides some coverage of the shelf space thereon. This is particularly important for covering the space above the top shelf board 160[4]. If the shelf boards 160[1:4] are not transparent, then the antenna 170[1] under the bottom shelf board 160[1] would not be used, and an additional antenna would need to be placed above the top shelf 160[4]. If all the distributed antennas 170[1:4] are intended to be fed by a single RFID reader, then transmission lines (not shown) will be needed to connect each distributed antenna, such as 170[1], to the RFID reader (not shown). One skilled in the art would also realize that a distributed antenna like 140 of FIG. 1A may be used for the distributed antenna 170[1:4] of FIG. 1B. Therefore, implementation of the shelf antenna system described hereinafter will be focused on the shelf 100 of FIG. 1A.

Figure 2:
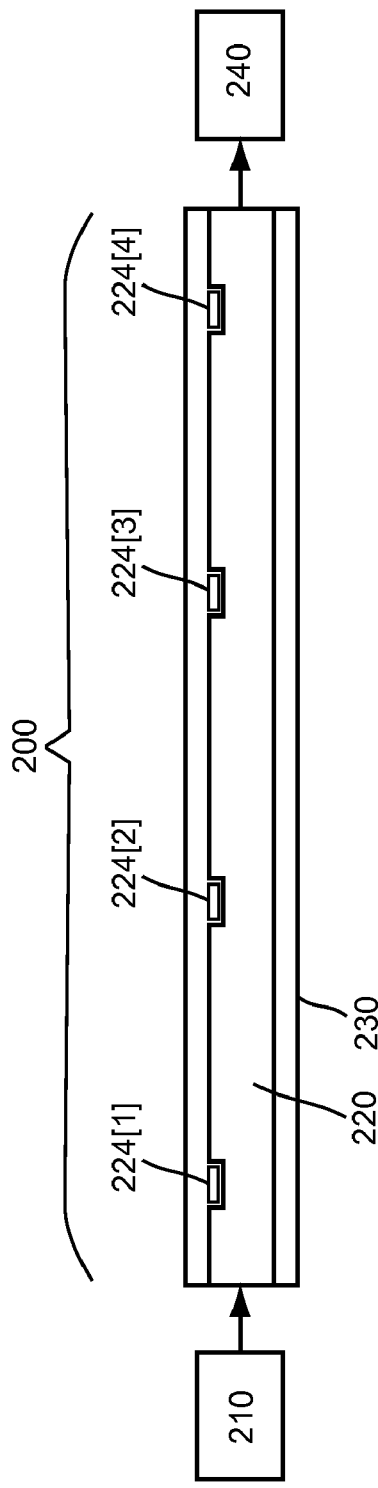
FIG. 2 is a top view of a low profile distributed antenna.

FIG. 2 is a top view of a distributed antenna 200 as disclosed by Burnside et al., also inventors of the present invention, in a U.S. patent application Ser. No. 11/690,562, filed on Mar. 23, 2007. The distributed antenna 200 comprises a parallel-plate waveguide that is used to feed radiators 224[1:4] along its length. A top plate 220 of the parallel-plate waveguide is narrower than a bottom plate 230 of the same. A feeder 210 is connected to one end of the distributed antenna 200, and a terminator 240 is connected to the other end of the distributed antenna 200. The radiators 224[1:4] as shown in FIG. 2 are formed by the rectangular slots cut in the top plate 220. The simplicity of this antenna system is that each radiator 224[1:4] is fed in series; thus, one can have many radiators but only one feed point. In addition, the transmission line used to feed this structure is a very simple parallel-plate waveguide as opposed to more complex rectangular waveguides or coax cable structures. The top and bottom plates, 220 and 230, respectively, are separated by a foam spacer, which can be manufactured today to very fine tolerances (a few thousands of an inch tolerance is achievable today in mass production). Also, this antenna 200 can be encapsulated in a conduit that is used to precisely align the parallel-plate structure along its length and to protect it from a hostile outside environment. Since the conduit structure can be easily made using mass production techniques, this whole new antenna concept lends itself to precise, low cost, high volume antenna applications, such as the RFID shelf antenna system.

However, in order to properly serve as a RFID shelf antenna, the radiators 224[1:4] of FIG. 2 need to provide at least 30 MHz of bandwidth. An effective way for increasing the bandwidth is to increase the spacing between the top and bottom plates, 220 and 230, respectively. For instance, it works reasonably well for RFID applications when the top plate 220 is 25.4 mm wide, the bottom plate 230 is 38.1 mm wide, the rectangular radiator slot 224 is 162 mm long and 10.7 mm deep, and the spacing between the top and bottom plates, 220 and 230, respectively, is set at 12.7 mm.

In designing the shelf antenna 140 of FIG. 1A using the distributed antenna concepts, it becomes obvious that a half wavelength spacing between the radiating elements 224[1:4] as shown in FIG. 2 will not work well for the slot radiators, because the radiations would be out-of-phase and tend to destructively interfere with each other. Thus, one wavelength spacing is preferred as the radiating elements 224[1:4] would tend to radiate in-phase. In addition, one wavelength or about 12.6" matches the normal store shelf spacing, such as shown in FIG. 1. With the aforementioned design criteria, the shelf antenna 140 for the typical 6' tall store shelf 100 would be composed of six to seven radiating elements.

Since the distributed antenna system continually radiates energy along its length, the power level of the RF signal propagating in this distributed antenna will continue to decay from the feed to the termination. This means that the last radiator will not radiate as much energy as the first element if all the radiators are identical. To overcome this shortcoming, the distributed antenna was terminated with a short circuit so that the RF energy reaching the termination would be reflected back and added to the incident signal. Referring back to FIG. 2, the terminator 240 is a conductor shorting the top plate 220 to the bottom plate 230 according to the embodiment of the present invention. Of course, the reflective energy from the short-circuited terminator 240 results in more radiated power coming from the later radiators provided that it is properly placed relative to the short-circuit terminator. Therefore, the spacing between the last radiating element 224[4] and the terminator 240 as shown in FIG. 2 should be optimized so that radiations from all the radiating elements 224 [1:4] are uniform. One skilled in the art may also appreciate that both ends of the distributed antenna can be fed by a RFID reader.

Figure 3:
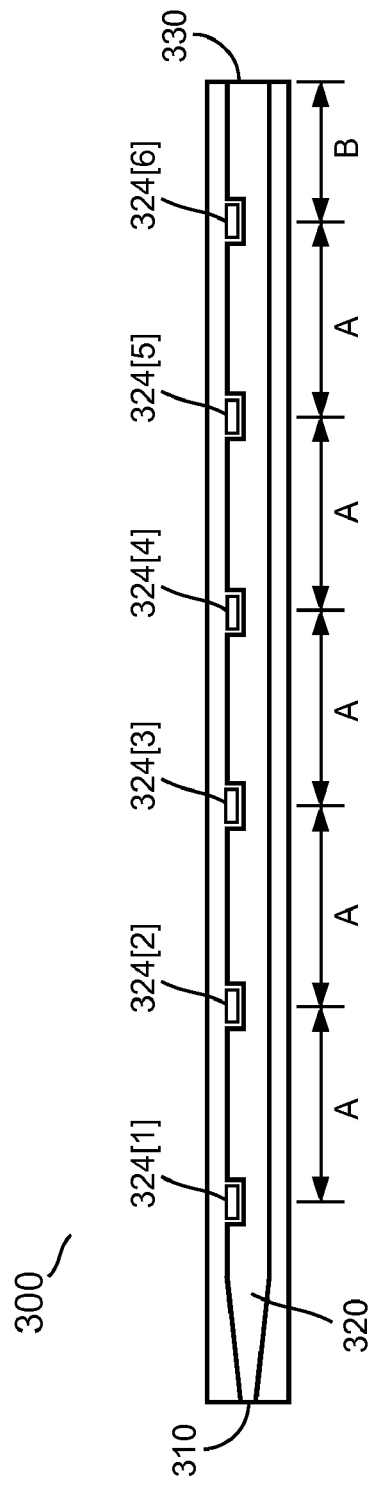
FIG. 3 is a top view of an optimized distributed antenna with 6-radiators.

FIG. 3 is a top view of an optimized distributed antenna 300 with 6-radiators 324[1:6] on a top plate 320 for serving as the shelf antenna 140 of FIG. 1A. Spacing A between adjacent radiators 324[1:6] is set at 12.6". Spacing B between the last radiator 324[6] and a terminator end 330 is about 6.6". Note that the top plate 320 can be tapered toward the feed end 310 of the distributed antenna 300.

Figure 4:
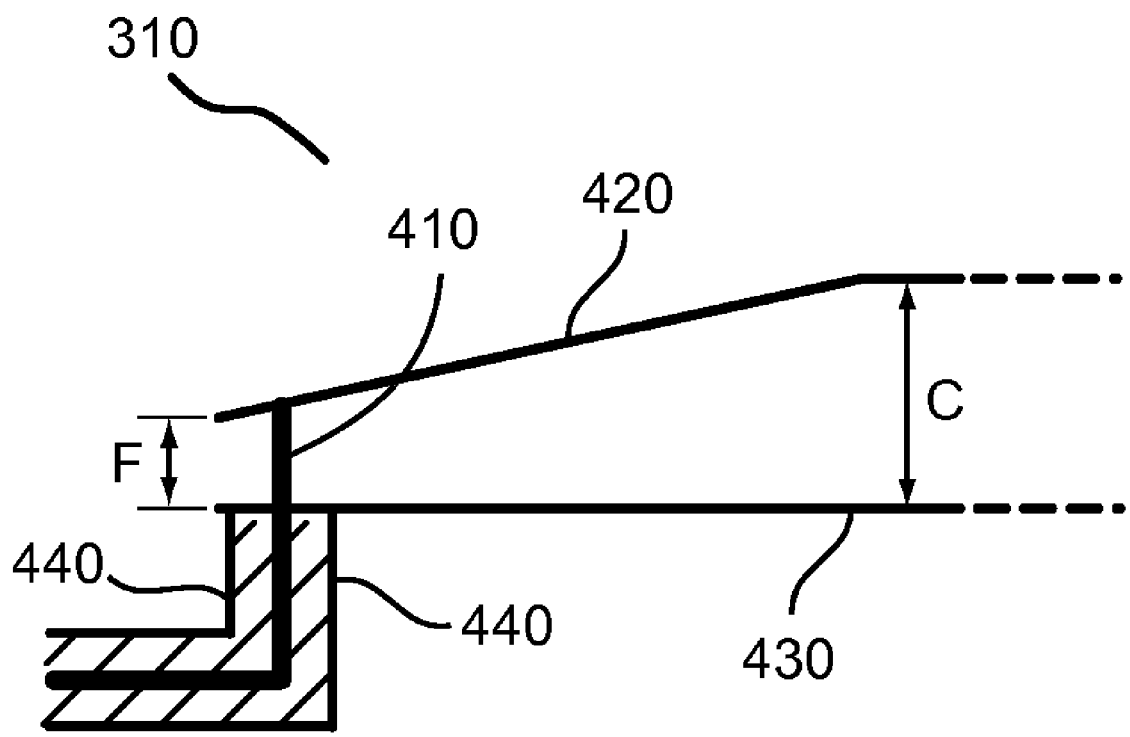
FIG. 4 is a side cross-sectional view of the feed end 310 of FIG. 3.

FIG. 4 is a side cross-sectional view of the feed end 310 of FIG. 3. A top plate 420 is tapered downward at the feed end 310. In an exemplary distributed antenna, a spacing C between the top and bottom plates in the parallel section may be ½", and a spacing F at the feed end may taper down to ¼". A center conductor 410 of a coax cable is connected to the top plate 420, and a metallic shield of the coax cable is connected to a bottom plate 430. The purpose of the taper is to match the parallel-plate transmission line, which has a characteristic impedance of about 100 ohms, to the coax cable which has an impedance of 50 ohms.

Referring back to FIG. 1A, in theory the single shelf antenna 140 is able to read tagged items everywhere on both the front and back shelves of a rather wide, such as 8' long, store shelf. But in practice, such a shelf antenna system 100 often experiences fading problems, i.e., multipath interference causes zones of low signal strength. The fading problem happened because the illumination of some tagged items is too weak to activate the RFID chip. The fading is particularly difficult to mitigate because the shelf antenna 140 is fixed as well as the tagged items. In addition, the frequency bandwidth is very narrow, which means that the fading will not change until some other dynamic is introduced to change this situation.

To solve the fading problem, it would be very helpful if the shelf antenna 140 is moved. This would change the position of the fading nulls within the shelves 110[1:6] and 115[1:6] and any un-read tagged items may be read in another attempt. Unfortunately, this motion approach would be too expensive to implement. On the other hand, since the distributed antenna 140 is inexpensive to acquire and easy to install, a second or multiple shelf antennas could be placed at new locations separate from the first shelf antenna in both the horizontal and vertical directions in lieu of moving the sole antenna 140.

Figure 5:
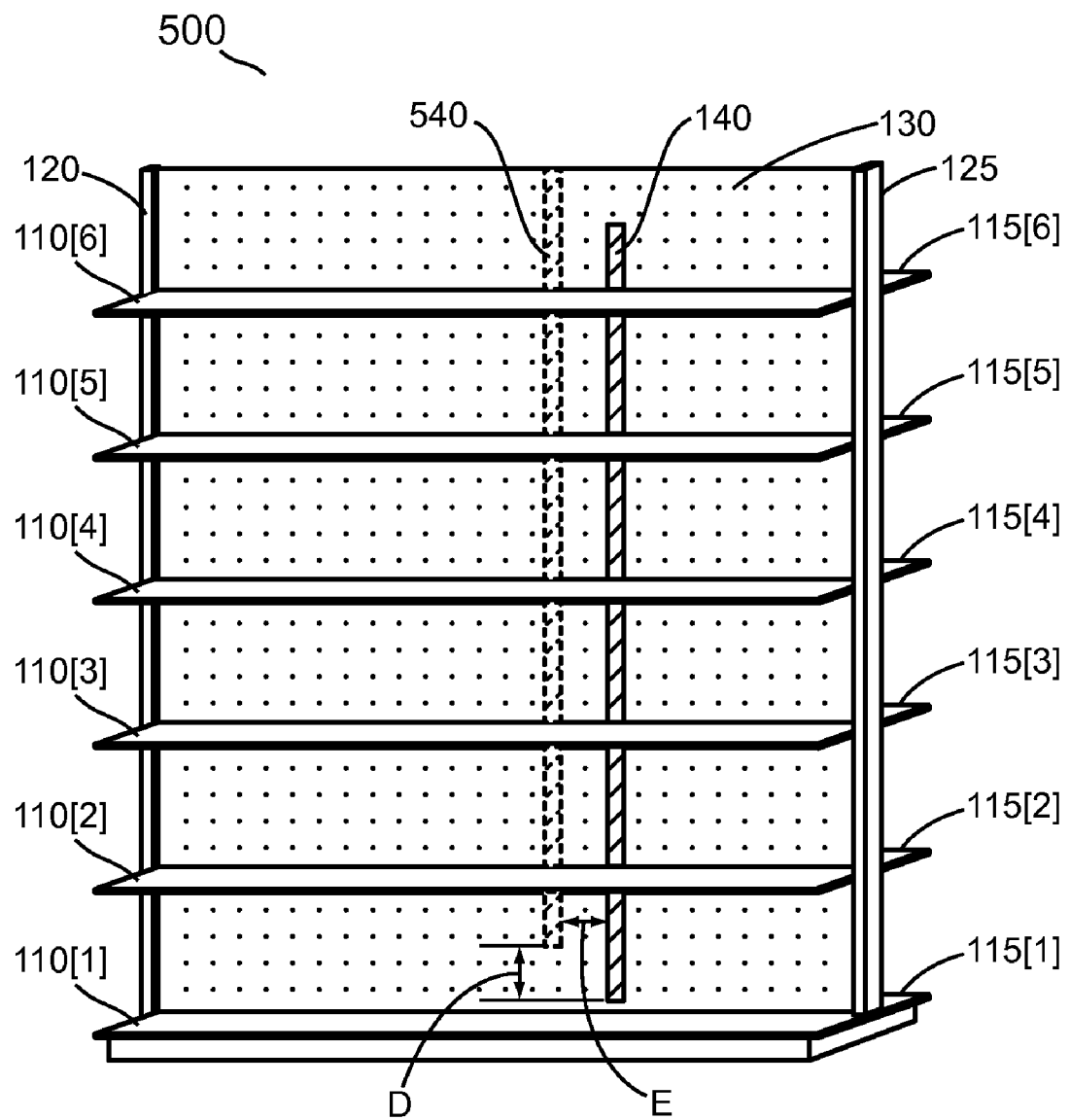
FIG. 5 is a perspective view of the store shelf of FIG. 1A with a second distributed antenna installed according to a third embodiment of the present invention.

FIG. 5 is a perspective view of the store shelf 500 modified from the store shelf 100 of FIG. 1A by adding a second distributed antenna 540 according to a second embodiment of the present invention. The second distributed antenna 540 is identical to the first distributed antenna 140 in terms of radiating elements, and is connected to the same RFID reader (not shown), but in a separate location. A vertical distance D and a horizontal distance E between the first distributed antenna 140 according to the second embodiment of the present invention. Here the distances D and E refer to distances between a radiating element in the first distributed antenna 140 and a corresponding radiating element in the second distributed antenna 540. One example is for D=4" and E=6". Besides, the second distributed antenna 540 may be installed in the back side of the peg board 130. Nevertheless, both distributed antennas can read all the tagged items on both the front shelves 110[1:6] and the back shelves 115[1:6]. Since radiators on the distributed antenna 140 or 540 are about 12" apart as depicted in FIG. 3, the 4" vertical and 6" horizontal placement of the second antenna simulates moving the first distributed antenna 140, which means that the fading nulls seen across the shelves 110[1:6] and 115[1:6] also have to move. Thus, adding the second distributed antenna 540 can potentially solve the fading problem.

Referring back to FIG. 5, although only one pair of distributed antennas 140 and 540 is illustrated, one skilled in the art would appreciate additional pairs of distributed antennas may be mounted on the peg board if the store shelf 500 is too wide for a single pair of distributed antennas to cover. Multiple pairs of distributed antennas may be connected to a single RFID reader, their superimposed coverage ensures minimizing the signal nulling spots throughout the entire space of the store shelf 500.

Another factor of concern is that these shelves 110[1:6] and 115[1:6] as well as some tagged items are all made of metal. Metal shelves and metal tagged items may cause significant multipath. Nevertheless, the present shelf antenna system as shown in FIGS. 1 and 5 is proven to be able to read nearly all the tagged items.

Referring back to either FIG. 2 or 3, the rectangular slot radiators 224[1:4] or 324[1:6] radiate a parallel-polarized signal field. Note that the parallel-polarization means that the radiated signal is polarized parallel to the length of the distributed antenna 200 of FIG. 2 or 300 of FIG. 3. When the distributed antenna is vertically installed in a store shelf, such as the one shown in FIG. 5, the associated radiated field is also vertically polarized. It is known that a vertically polarized antenna works well for metal shelves and tagged metallic items. However, it does not work as well for non-metallic tagged items that could also be placed on the same metal shelves. This happens because the metal shelf and tagged metallic items force the field in-between the tagged metallic items and the metal shelf to be vertically polarized. Since it was vertically polarized, the field was the proper polarization to be received by a folded tag antenna, which is mounted between the metal tagged item and the metal shelf. In which case, vertical polarization is all that was needed for the tagged metallic items on metal shelves. In more general cases, the polarization at each position on the shelves has to be represented by two independent polarizations. Thus, new radiating elements that radiate orthogonal polarizations are more desirable than the simple rectangular slot radiating elements 224 [1:4] or 324[1:6].

Figure 6:
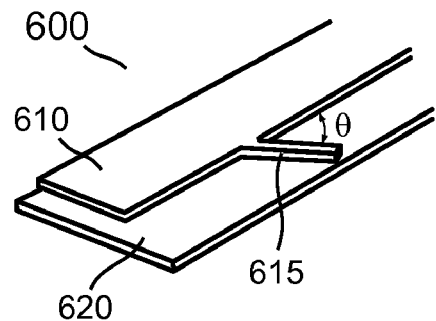
FIG. 6 is a perspective view of a section of a distributed antenna with a protruding radiating element.
Figure 7A:
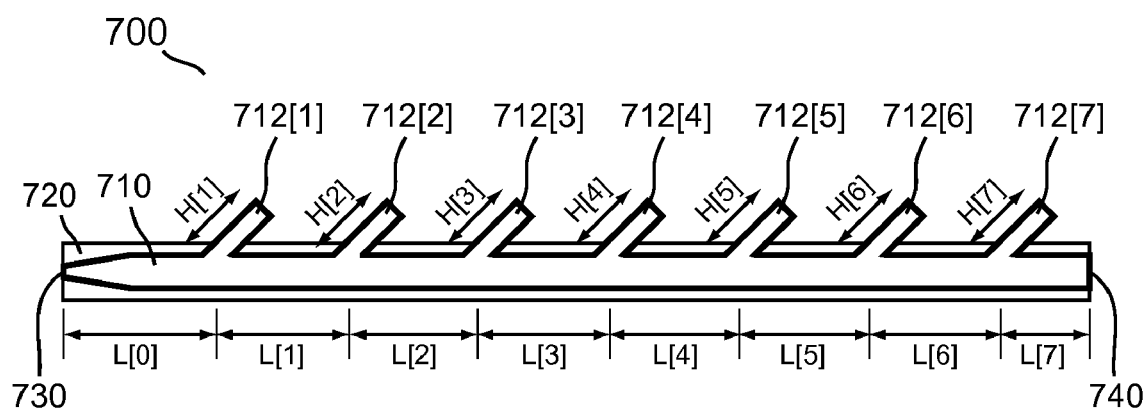
FIG. 7A is a top view of a distributed antenna with seven protruding radiating elements attached to a top plate.

FIG. 6 is a perspective view of a section of a distributed antenna 600 with a protruding object 615 serving as a radiating element. The protruding object 615 is a conductive strip attached to a top plate 610 at an angle θ by a conductive connection or capacitive RF coupling. Therefore the protruding object 615 can radiate both vertically and horizontally polarized signals. For the distributed antenna 200 of FIG. 2 or 300 of FIG. 3, the conductive strip is typically 70 mm long and 10 mm wide and oriented such that the angle θ=45°. One skilled in the art may also realize that the angle θ can be any value, which results in different polarization radiations. Note that the capacitive coupling occurs in that the radiator conducting strip 615 couples through a very thin gap between it and the top plate 610. That being the case, the protruding radiator 615 is quite easy to build, which makes it a very cost effective and reliable solution. When forming a distributed antenna using a plurality of the protruding radiating elements 615, uniform radiation may also be achieved through simulation and experiments. It was also learnt from simulations and experiments that the shelf antenna with 45° polarized radiators should be at least a foot longer than the previous designs with rectangular slot radiators in order to provide additional coverage for tagged boxes that may be stacked on the top shelf (110[6] and 115[6] as shown in FIG. 1A or FIG. 5). This may result in a distributed antenna having 7 or 8 radiators for a six-layer store shelf. FIG. 7A is a top view of a distributed antenna 700 with seven protruding radiating elements 712[1:7] attached to a top plate 710. L[0] denotes a distance between a feed 730 and the first protruding radiating elements 712[1]. L[1:6] denote distances between two adjacent protruding radiating elements 712[1:7], respectively. L[7] denotes a distance between the last protruding radiating element 712[7] and an end terminal 740. A short circuit (not shown) is provided to the end terminal 740 for reflecting RF energy back to the distributed antenna 700. H[1:7] denote lengths of the protruding radiating elements 712[1:7], respectively. Since the RFID signal in the parallel-plate transmission line decays along its length, it is obvious that the earlier radiators had to be shorter than the later ones. Radiation level can be controlled by varying the lengths of the radiators 712[1:7].

TABLE 1

| Parameter | Distance | Parameter | Length |
|---|---|---|---|
| L[0] | 12.3" | | |
| L[1] | 12" | H[1] | 2.27" |
| L[2] | 13.4" | H[2] | 2.32" |
| L[3] | 13.4" | H[3] | 2.48" |
| L[4] | 13.4" | H[4] | 2.50" |
| L[5] | 13.4" | H[5] | 2.52" |
| L[6] | 13.4" | H[6] | 2.66" |
| L[7] | 3.0" | H[7] | 2.68" |

Once the radiator lengths H[1:7] are determined, the radiators are placed along the length of the distributed antenna 700 to obtain a desired impedance performance. From an impedance study, it was found that the radiators 712[1:7] could be placed at a uniform spacing except for the radiator 712[1] closest to the feed point. TABLE 1 summarizes values of both L[0:7] and H[1:7] for achieving uniformity of the radiation. This distributed antenna 700 works very well for the store shelf 100 except the top shelf 110[6] and 115[6] of FIG. 1A, because the last radiator 712[7] closest to a short circuit at a terminal end of the distributed antenna 700 radiates a very strong cross-polarized signal. To correct this cross-polarized radiation, the last radiator 712[7] could be moved closer to the short-circuit termination. As such, the distributed antenna design can be modified with uniformly spaced radiators 712 [1:7] with the same length except the first one 712[1] closest to the feed point. TABLE 2 summarizes all the dimensions of this alternative design.

TABLE 2

| Parameter | Distance | Parameter | Length |
|---|---|---|---|
| L[0] | 10.6" | | |
| L[1] | 13.8" | H[1] | 2.5" |
| L[2] | 13.8" | H[2] | 2.7" |
| L[3] | 13.8" | H[3] | 2.7" |
| L[4] | 13.8" | H[4] | 2.7" |
| L[5] | 13.8" | H[5] | 2.7" |
| L[6] | 13.8" | H[6] | 2.7" |
| L[7] | 1.0" | H[7] | 2.7" |

Figure 7B:
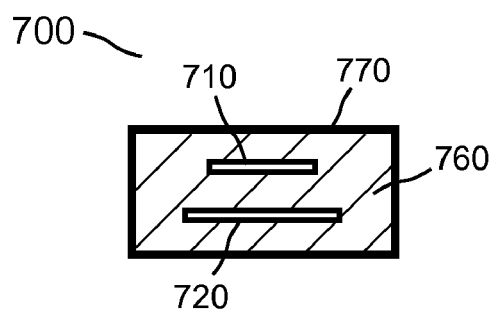
FIG. 7B is a cross-sectional view of an assembly of the distributed antenna of FIG. 7A

FIG. 7B is a cross-sectional view of an assembly of the distributed antenna 700 of FIG. 7A. The top plate 710 and the bottom plate 720 are separated by a foam material 760. A RF transparent tough shell 770 surrounding the foam material 760 is used to enclose and protect the actual antenna. Note that the foam material 760 is used here as an illustration of a low-loss material that can be used in practice. Thus, any low-loss dielectric material can be used for this application provided that it has the structural integrity to properly separate and hold the parallel-plate structure.

Figure 8A:
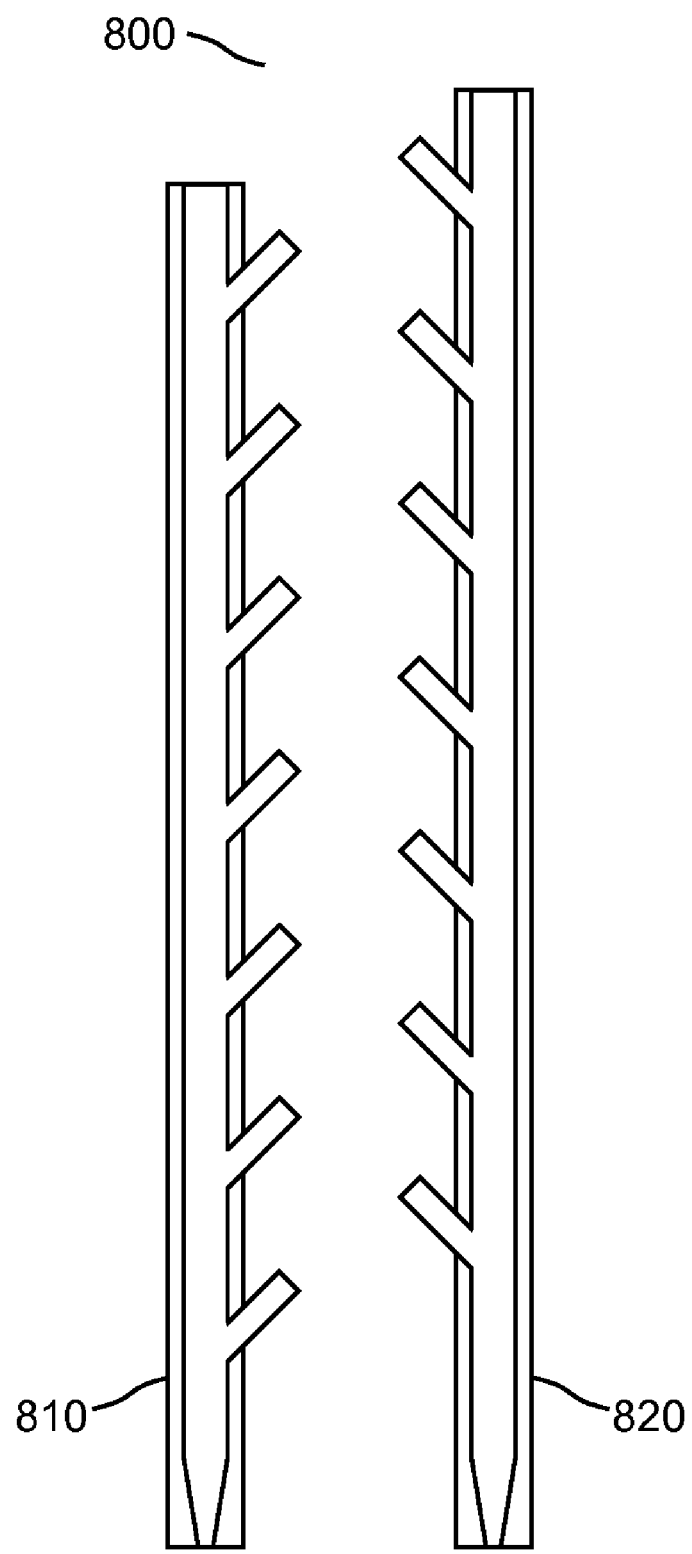
FIG. 8A illustrates a distributed antenna pair with cross-polarized radiators.
Figure 8B:
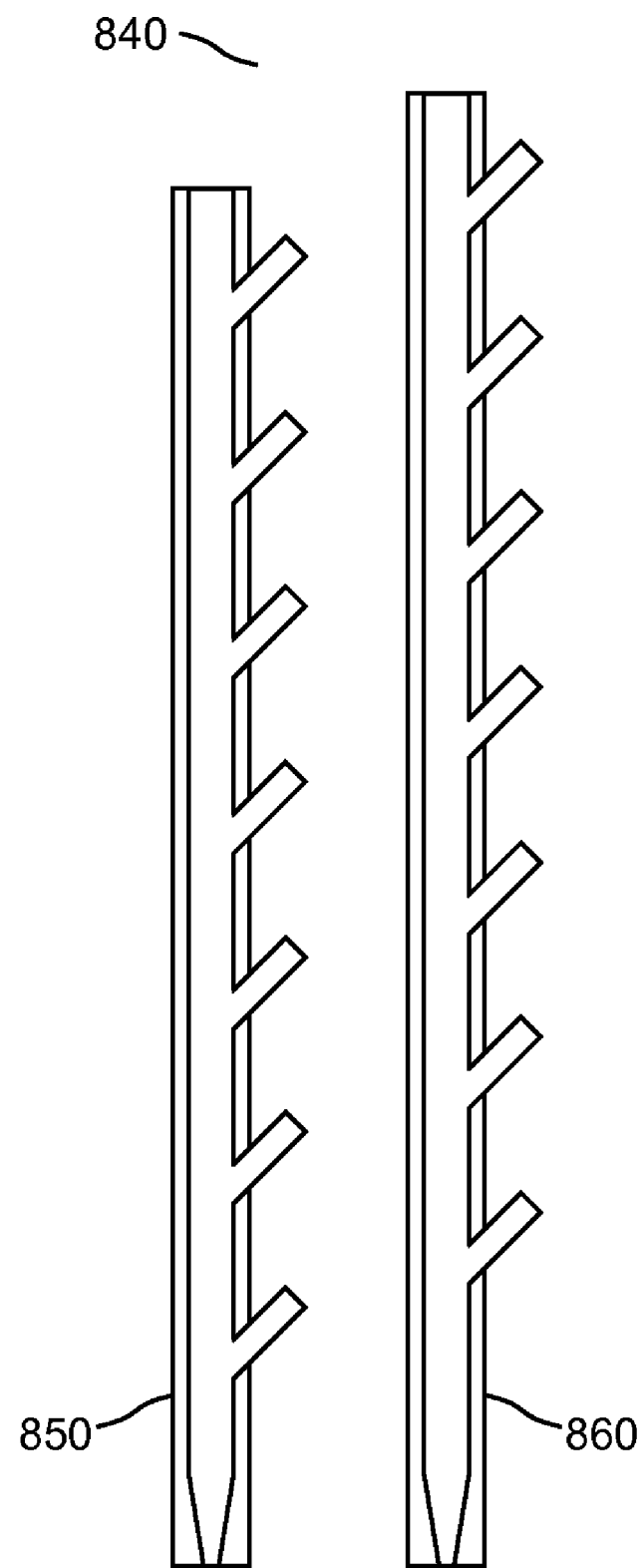
FIG. 8B illustrates a distributed antenna pair with co-polarized radiators.

Referring back to FIG. 5, apparently, the distributed antenna pair 140 and 540 can each be replaced by the distributed antenna 700 of FIG. 7A. FIGS. 8A and 8B illustrate two potential antenna system layouts using the 45° polarized radiator design.

FIG. 8A illustrates a distributed antenna pair 800 with cross-polarized radiators. Two distributed antennas 810 and 820 are closely placed in parallel. The distributed antenna 810 has 45° polarized radiators while the distributed antenna 820 has −45° polarized radiators.

FIG. 8B illustrates a distributed antenna pair 840 with co-polarized radiators. Similar to the distributed antenna pair 800, two distributed antennas 850 and 860 are closely placed in parallel, however, both have 45° polarized radiators.

In both designs, shown in FIGS. 8A and 8B, the two antennas 810 vs. 820 and 850 vs. 860 are placed with proper separation to provide spatial diversity as depicted by FIG. 5. Therefore, these designs can provide both polarization and spatial diversities at the same time, hence better coverage for shelving systems.

Figure 8C:
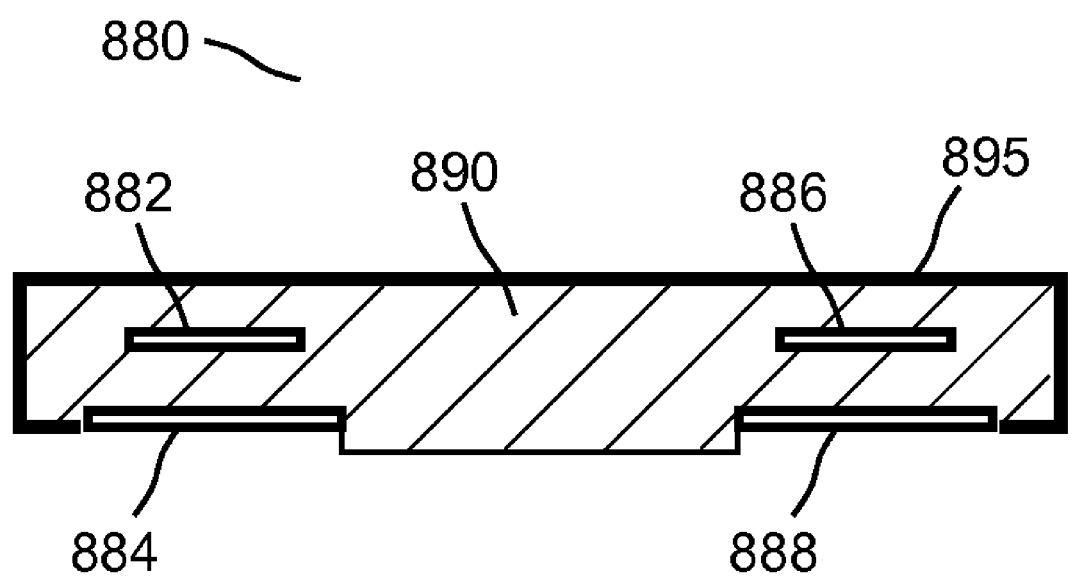
FIG. 8C is a cross-sectional view of an assembly of a distributed antenna pair.

FIG. 8C is a cross-sectional view of an assembly 880 of a distributed antenna pair. A top plate 882 and a bottom plate 884 are for a first distributed antenna. A top plate 886 and a bottom plate 888 are for a second distributed antenna. A foam material 890 separates the top from bottom plates as well as the first from the second distributed antenna. A RF transparent tough shell 895 surrounding the foam material 890 is used to enclose and protect the actual antennas. Note that the foam material is used here as an illustration of a low-loss material that can be used in practice. Thus, any low-loss dielectric material can be used for this application provided that it has the structural integrity to properly separate and hold the two parallel-plate structures. This assembly 880 is designed for the distributed antenna pair being mounted on the same side of a peg board. When a distributed antenna pair is also required to be mounted on the other side of the peg board as shown in FIG. 5, a single or dual antenna assembly can be used dependent on the desired RFID read performance and size of the shelving system that is being illuminated by the antennas. Note that even the dual co-polarized antenna as shown in FIG. 8B will provide dual polarization illumination of the shelving system when one is mounted on the front and the other on the back of the peg board.

So far, the focus of the previous designs is for a shelf antenna that can be used to interrogate RFID tagged items mounted on standard retail outlet shelving system such as the one shown in either FIG. 1A or 5. These shelves are on the order of 6' tall. In other applications, such as in warehouse areas or hardware stores like Lowes and Home Depot, much longer designs may be needed to cover the entire shelf with a single RFID reader antenna. The distributed antenna described above can still be adopted here by simply joining a plurality of such 6' long distributed antennas to reach a desired length. A 24' long distributed antenna would require 4 pieces of the 6' long distributed antennas.

Figure 9A:
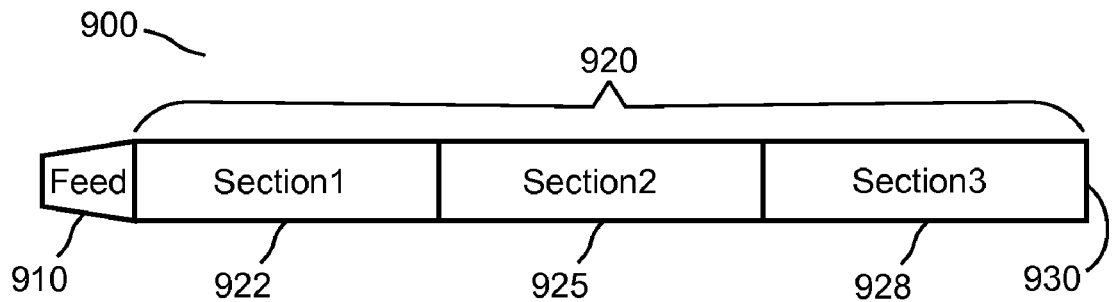
FIG. 9A illustrates a long distributed antenna with multiple sections.

FIG. 9A illustrates a long distributed antenna 900 with three sections 922, 925 and 928. The longer length will inevitably cause further decay of the transmitted RF energy, because the distributed antenna continually radiates RF energy along its length. If one uses the same radiator elements along the full length of the long distributed antenna, the radiating level at a termination end 930 will be much lower than that near a feed end 910. To solve this problem, section1 922 may use low radiating radiators, section2 925 may use medium radiating radiators and section3 928 may use high radiating radiators. The percentage of increase in radiated power for each of the sections 922, 925 and 928 is determined so that each section tends to radiate the same amount of power even though the RF power in the parallel-plate waveguide that forms the distributed antenna 900 is continually decaying along the length 920 of distributed antenna 900.

Figure 9B:
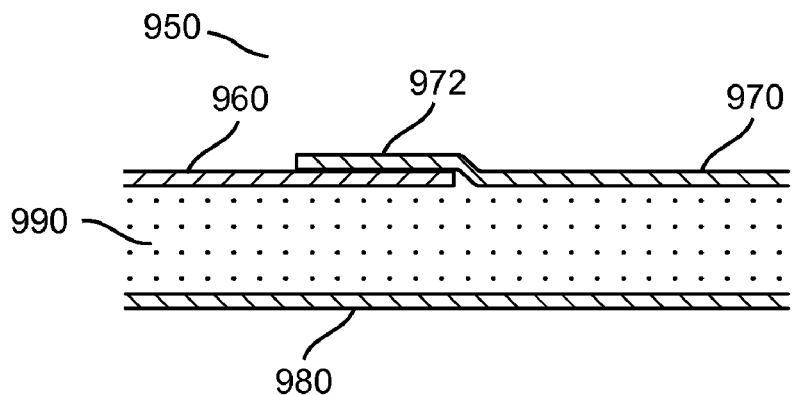
FIG. 9B illustrates a splicing device for joining two distributed antennas.

FIG. 9B illustrates a splicing device 950 for joining two sections of distributed antennas. A top plate 960 of a first section overlaps an extended portion 972 of a top plate 970 belonging to a second section. A bottom plate 980 which is also used to add rigidity to the multi-sectional distributed antenna is a continuous conductor across the entire length of the antenna. A foam spacer 990 is also continuous and bonded to the bottom plate 980 and the top plates 960 and 970. Since the total length of the antenna is made in sections, one can think of making this antenna by bonding a ½" foam spacer onto a bottom 24' structural conductor 980. Then sections of top plates including radiator elements are bonded on top of the foam spacer with an overlapping between two adjacent sections. In such a splicing way, a long distributed antenna can be made from multiple sections. This splicing can also be made by adding a separate conducting piece to bridge the gap between the two sections.

The distributed shelf antennas shown in FIGS. 2, 3, 7A, 8A and 8B of the present disclosure have radiating elements that are spaced approximately 13 inches apart, which corresponds to about one wavelength at the RFID center frequency of 915 MHz. This spacing is chosen so that the radiating elements radiate in phase, and provides at least one radiating element per shelf. It is also possible to space the elements one-half wavelength apart and still radiate in phase, if alternating elements are reversed. This provides twice the number of elements per unit length along the shelf antenna.

Figure 10:
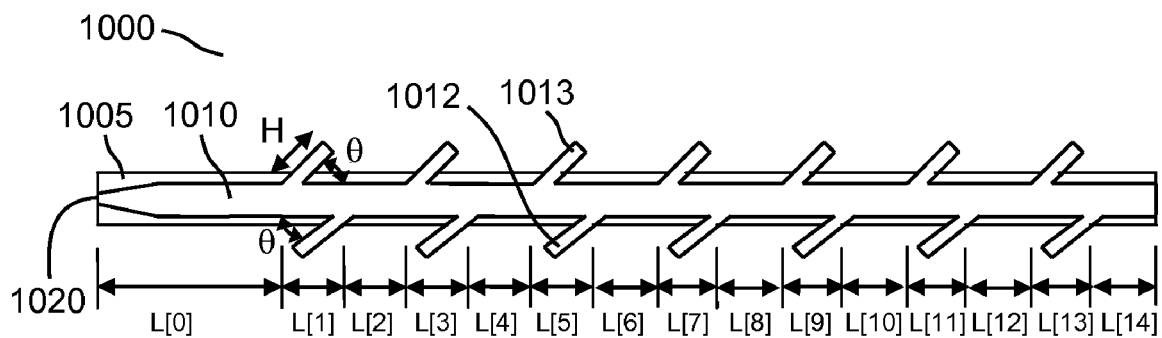
FIG. 10 illustrates an alternative distributed antenna.

FIG. 10 illustrates such a distributed antenna 1000. Alternating strips 1012 and 1013 are reversed in angle and attached to the opposite edge of the top conductor 1010 of the parallel-plate distributed antenna 1000. As an example, this antenna 1000 is 8 feet long and has 14 radiating strip elements. TABLE 3 lists the dimensions shown in FIG. 10.

TABLE 3

| Parameter | Dimension |
|---|---|
| H | 1.77" |
| θ | 45° |
| L[0] | 9.2" |
| L[1] | 6.4" |
| L[2] | 9.0" |
| L[3] | 6.4" |
| L[4] | 6.4" |
| L[5] | 6.4" |
| L[6] | 6.4" |
| L[7] | 6.4" |
| L[8] | 6.4" |
| L[9] | 6.4" |
| L[10] | 6.4" |
| L[11] | 6.4" |
| L[12] | 6.4" |
| L[13] | 6.4" |
| L[14] | 1.0" |

Referring to TABLE 3, all of the spacings L[1:13] between two adjacent radiating elements 1012 and 1013 are 6.4", except for the spacing L[2] between the second and third radiating elements from the feed terminal 1020. This spacing was adjusted to tune the antenna for maximum uniform radiation from all elements and minimum reflection back to the feed.

The above illustrations provide many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A shelf antenna system for radio frequency identification (RFID) applications, the shelf antenna system comprising:
    a plurality of substantially horizontal shelves providing a plurality of shelf spaces above the plurality of substantially horizontal shelves, respectively; and
    a first parallel-plate transmission line having a first feed terminal and a first plurality of radiating elements forming a first distributed antenna thereby, at least one of the first plurality of radiating elements being disposed in each of the plurality of shelf spaces,
    wherein the plurality of shelf spaces are covered by radiations from the first distributed antenna.

2. The shelf antenna system of claim 1, wherein
    the plurality of substantially horizontal shelves are made of metal material and mounted against a vertical peg board; and
    the first parallel-plate transmission line is substantially vertically mounted on the vertical peg board.

3. The shelf antenna system of claim 1, wherein
    the plurality of substantially horizontal shelves are made of metal material and mounted against a vertical back wall of a shelving unit; and
    the first distributed antenna is substantially vertically mounted on the vertical back wall of the shelving unit.

4. The shelf antenna system of claim 1, wherein one or more portions of the first parallel-plate transmission line is mounted parallel to at least one of the plurality of substantially horizontal shelves.

5. The shelf antenna system of claim 4, wherein the one or more portions of the first distributed antenna are attached to undersides of one or more of the plurality of substantially horizontal shelves, respectively.

6. The shelf antenna system of claim 1, wherein the first plurality of radiating elements on the first parallel-plate transmission line have different dimensions for achieving uniform radiation from the plurality of radiating elements.

7. The shelf antenna system of claim 1, wherein the first plurality of radiating elements are slots cut into a first plate of the first parallel-plate transmission line.

8. The shelf antenna system of claim 1, wherein the first plurality of radiating elements are protruding conductive strips coupled to a first plate of the first parallel-plate transmission line and forming a predetermined angle, the coupling between the conductive strips and the first plate consisting of the group selected from electrical connecting, capacitive coupling and inductive coupling.

9. The shelf antenna system of claim 8, wherein the predetermined angle is 45°.

10. The shelf antenna system of claim 1, wherein the first plurality of radiating elements are conductive patches coupled to a first plate of the first parallel-plate transmission line, the coupling between the conductive patches and the first plate consisting of the group selected from electrical connecting, capacitive coupling and inductive coupling.

11. The shelf antenna system of claim 1, wherein the first plurality of radiating elements are conductive loops coupled to a first plate of the first parallel-plate transmission line, the coupling between the conductive loops and the first plate consisting of the group selected from electrical connecting, capacitive coupling and inductive coupling.

12. The shelf antenna system of claim 1, wherein the first plurality of radiating elements are divided into a first and second group of radiating elements, the first group of radiating elements being disposed on a first elongated edge of the parallel-plate transmission line, the second group of radiating elements being disposed on a second elongated edge of the parallel-plate transmission line, and the first and second elongated edge being substantially parallel to each other.

13. The shelf antenna system of claim 12, wherein the first and second group of radiating elements are cross-polarized radiators.

14. The shelf antenna system of claim 1 further comprising a second parallel-plate transmission line substantially parallel to, yet separated from the first parallel-plate transmission line by a first predetermined distance in the horizontal direction and a second predetermined distance in the vertical direction.

15. The shelf antenna system of claim 14, wherein the first and second predetermined distances are less than a wavelength of an operating RFID signal.

16. The shelf antenna system of claim 1 further comprising a second parallel-plate transmission line having a second plurality of radiating elements, the second parallel-plate transmission line being serially connected with the first parallel-plate transmission line to form an extended distributed antenna.

17. The shelf antenna system of claim 16, wherein the first plurality of radiating elements of the first parallel-plate transmission line have lower radiating level than the second plurality of radiating elements of the second parallel-plate transmission line when the first parallel-plate transmission line is connected to a RFID reader.

18. The shelf antenna system of claim 1 further comprising a second feed terminal also serially coupled to the first plurality of radiating elements, and the first and second feed terminals are connected to the RFID reader.

19. A shelf antenna system for radio frequency identification (RFID) applications, the shelf antenna system comprising:
a plurality of substantially horizontal shelves providing a plurality of shelf spaces above the plurality of substantially horizontal shelves, respectively;
a first parallel-plate transmission line having a first feed terminal and a first plurality of radiating elements; and
a second parallel-plate transmission line having a second feed terminal and a second plurality of radiating elements,
wherein the first and second feed terminals are connected together and at least one of the first and second plurality of radiating elements being disposed in each of the plurality of shelf spaces, so that the plurality of shelf spaces are covered by radiations from the shelf antenna system.

20. The shelf antenna system of claim 19, wherein
the plurality of substantially horizontal shelves are made of metal material and mounted against a vertical peg board; and
the first and second parallel-plate transmission lines are substantially vertically mounted on the vertical peg board.

21. The shelf antenna system of claim 19, wherein
the plurality of substantially horizontal shelves are made of metal material and mounted against a vertical back wall of a shelving unit; and
the first distributed antenna is substantially vertically mounted on the vertical back wall of the shelving unit.

22. The shelf antenna system of claim 19, wherein one or more portions of the first and second parallel-plate transmission lines are mounted parallel to at least one of the plurality of substantially horizontal shelves.

23. The shelf antenna system of claim 22, wherein the one or more portions of the first and second parallel-plate transmission lines are attached to undersides of one or more of the plurality of substantially horizontal shelves, respectively.

24. The shelf antenna system of claim 22, wherein the first and second parallel-plate transmission lines are substantially parallel to each other and separated by a first predetermined distance in the horizontal direction and a second predetermined distance in the vertical direction.

25. The shelf antenna system of claim 24, wherein the first and second predetermined distances are less than a wavelength of an operating RFID signal.

* * * * *